United States Patent
Mori et al.

(10) Patent No.: US 11,748,753 B2
(45) Date of Patent: *Sep. 5, 2023

(54) MESSAGE DELAY ESTIMATION SYSTEM AND METHOD

(71) Applicant: VISA INTERNATIONAL SERVICE ASSOCIATION, San Francisco, CA (US)

(72) Inventors: Michael Kenji Mori, Foster City, CA (US); Gourab Basu, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,305

(22) Filed: Jul. 28, 2022

(65) Prior Publication Data

US 2022/0366412 A1    Nov. 17, 2022

Related U.S. Application Data

(63) Continuation of application No. 15/908,361, filed on Feb. 28, 2018, now Pat. No. 11,423,401.

(51) Int. Cl.
  *G06Q 20/40*   (2012.01)
  *G06N 20/00*   (2019.01)
  (Continued)

(52) U.S. Cl.
  CPC ........... *G06Q 20/401* (2013.01); *G06N 5/046* (2013.01); *G06N 20/00* (2019.01); *G06Q 20/023* (2013.01);
  (Continued)

(58) Field of Classification Search
  None
  See application file for complete search history.

(56) References Cited

U.S. PATENT DOCUMENTS 5,093,787 A * 3/1992 Simmons ........... G06Q 20/0425
                                        708/106
8,825,531 B1 * 9/2014 Catoe ................... G07G 1/0018
                                        705/16
(Continued)

FOREIGN PATENT DOCUMENTS

AU    2007257820 A1 *  1/2009   ............. G06Q 10/10
EP    3391326 A1      10/2018
(Continued)

OTHER PUBLICATIONS

Anonymous: "Artificial neural network-Wikipedia", Feb. 21, 2018, XP055586455, retrieved from the Internet: URL https://en.wikipedia.org/w/index.php?title=Artificial_neural_network&oldid=826911713, retrieved in May 7, 2019 (11 pages).

(Continued)

*Primary Examiner* — Neha Patel
*Assistant Examiner* — Jahed Ali
(74) *Attorney, Agent, or Firm* — K&L Gates LLP

(57) ABSTRACT

A clearing delay estimate may be employed that provides issuers with an accurate estimate for when a transaction will be cleared, thus providing more transparency to issuers to more efficiently manage funds. An algorithm may be employed to estimate clearance timing information and insert the timing information into communications with the issuer or other parties to a transaction involving a payment device. The estimated clearance timing information may be determined based on machine learning and other artificial intelligence techniques using historical data related to clearance timing for the particular entities involved in each transaction.

16 Claims, 6 Drawing Sheets

(51) Int. Cl.
*G06N 5/046* (2023.01)
*G06Q 20/10* (2012.01)
*G06Q 20/02* (2012.01)

(52) U.S. Cl.
CPC ......... *G06Q 20/102* (2013.01); *G06Q 20/405* (2013.01); *G06Q 20/4097* (2013.01)

(56) References Cited

U.S. PATENT DOCUMENTS

| | | | | |
|---|---|---|---|---|
| 9,286,608 | B1* | 3/2016 | Patel | G06Q 30/0229 |
| 10,121,217 | B2* | 11/2018 | Clubb | G06Q 40/08 |
| 10,402,807 | B1* | 9/2019 | Iyer | G06N 5/04 |
| 10,862,994 | B1* | 12/2020 | Ganjam | H04L 67/1001 |
| 10,915,900 | B1* | 2/2021 | Higgins | G06N 20/00 |
| 2004/0034596 | A1* | 2/2004 | Light | G06Q 20/04 |
| | | | | 705/40 |
| 2004/0077357 | A1* | 4/2004 | Nakada | H04B 1/7113 |
| | | | | 455/67.11 |
| 2004/0236547 | A1* | 11/2004 | Rappaport | G06Q 10/087 |
| | | | | 703/2 |
| 2007/0101120 | A1* | 5/2007 | Patel | H04L 9/12 |
| | | | | 713/151 |
| 2007/0262137 | A1* | 11/2007 | Brown | G06Q 20/40 |
| | | | | 235/379 |
| 2011/0145116 | A1* | 6/2011 | Lawson | G06Q 20/102 |
| | | | | 705/34 |
| 2014/0370851 | A1* | 12/2014 | Wang | G06Q 20/363 |
| | | | | 455/411 |
| 2017/0024731 | A1* | 1/2017 | Gullett | G06Q 20/10 |
| 2017/0178134 | A1* | 6/2017 | Senci | G06Q 20/4016 |
| 2017/0300903 | A1* | 10/2017 | Mori | G06Q 10/067 |
| 2019/0266607 | A1* | 8/2019 | Mori | G06N 5/046 |
| 2020/0090138 | A1* | 3/2020 | Cervenka | G06Q 20/023 |

FOREIGN PATENT DOCUMENTS

| | | | | |
|---|---|---|---|---|
| WO | 2015181596 | A1 | 12/2015 | |
| WO | 2017105760 | A1 | 6/2017 | |
| WO | WO-2017105760 | A1 * | 6/2017 | ......... G06Q 20/4016 |

OTHER PUBLICATIONS

D. K. Gifford, L. C. Stewart, A. C. Payne and G. W. Treese, "Payment switches for open networks," Digest of Papers. COMPCON' 95. Technologies for the Information Superhighway, 1995, pp. 26-31, doi: 10.1109/CMPCON1995.512359 (Year: 1995).
Extended European Search Report for Application No. EP19159592.5, dated May 14, 2019, 11 pages.
Office Action (Notice of Allowance and Fees Due (PTOL-85)) dated Apr. 19, 2022 for U.S. Appl. No. 15/908,361 (pp. 1-23).
Office Action dated Feb. 24, 2020 for U.S. Appl. No. 15/908,361 (pp. 1-16).
Office Action dated Jun. 1, 2020 for U.S. Appl. No. 15/908,361 (pp. 1-24).
Office Action dated Mar. 25, 2021 for U.S. Appl. No. 15/908,361 (pp. 1-25).
Office Action dated Nov. 21, 2019 for U.S. Appl. No. 15/908,361 (pp. 1-6).
Office Action dated Oct. 15, 2021 for U.S. Appl. No. 15/908,361 (pp. 1-29).
Operating rules for the Clearing House Electronic Check Clearing System. ip.com Disclosure No. IPCOM000242148D https://ip.com/IPCOM/000242148 (Year: 2011).

* cited by examiner

MESSAGE DELAY ESTIMATION SYSTEM AND METHOD

CROSS-REFERENCE TO RELATED APPLICATION

This application is a continuation of and claims priority to U.S. patent application Ser. No. 15/908,361, which was filed on Feb. 18, 2018, and is entitled "MESSAGE DELAY ESTIMATION SYSTEM AND METHOD." The entire contents of the aforementioned application are expressly incorporated by reference herein.

BACKGROUND

The "Four Party Model" describes the credit card business model consisting of card networks, issuing banks ("issuers"), cardholders or consumers, merchants, and acquirer. Virtually all electronic card payments are constructed on the back of the Four Party Model as it serves to keep the entire system working together. The consumer receives a payment card account from the issuer. The account could be a credit, debit, or prepaid type of account linked to a payment device. The account can operate via a number of different methods including the Internet, a physical card, or mobile devices.

A typical transaction occurs in three phases: authorization, clearing, and settlement. During authorization, a cardholder or consumer chooses goods and services they wish to purchase using the payment device linked to an issuer account. The merchant's acquirer bank receives the transaction from the merchant and contacts the card network (e.g., Diner's Club, Discover, etc.) to check card security features and sends the transaction to the cardholder's bank for approval. The issuer approves the transaction as well as the card network and replies to the merchant's bank. The merchant's bank sends approval to the merchant, and the cardholder completes the transaction and receives a receipt. During clearing, the merchant's bank sends a clearing message including the purchase information to the card network which validates the purchase information and sends the purchase information to the cardholder's bank. The clearing process reconciles the merchant's bank and cardholder's bank for the transaction. At settlement, the cardholder's bank sends payment to the card network, and the card network sends the payment to the merchant's bank. The merchants bank then pays the merchant, and the cardholder's bank bills the cardholder.

In the current four-party card ecosystem, the vast majority of payment card transactions are conducted using the dual message model. In this model, the authorization message occurs at the time of the transaction, but the process of settling/funds transfer does not initiate until the clearing message is submitted by the merchant's bank. This clearing message typically occurs as soon as the end-of-day, but can exceed 30 days in some markets. Because the timing of the clearing is variable (e.g., different card networks and acquirers may have different practices based on merchant type, risk levels, card type, etc.), issuers may have difficulty forecasting the extent of its settlement liabilities in any given day. This lack of visibility makes it difficult to optimize funding of settlement accounts. In some cases, issuers may adopt a more conservative transaction authorization profile and decline borderline risky transactions in order to conserve working capital to ensure that enough funds will be available for a particular day's unpredictable settlement totals.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The present disclosure provides a technical solution to the technical problem of estimating the delay in the clearing and settlement phases of a payment device transaction to optimize funding of settlement accounts. In a dual message transaction, a clearing delay estimate may be employed that provides issuers with an accurate estimate for when a transaction will be cleared, thus providing more transparency to issuers to more efficiently manage funds. Transactions may be denied or approved based on the clearing message delay being above or below a threshold.

A dual message transaction typically requires a physical or virtual signature. When a merchant's card processing system receives an authorization message, it creates a record of that authorization through what is known as "electronic draft capture" (EDC). EDCs are then stored in a "batch" until the merchant initiates a "batch processing", which typically takes place at least once a day. However, whereas high-volume merchants may process their batches multiple times per day, very low-volume merchants may do it on less than a daily basis. Whatever the frequency, however, merchants submit their authorized transactions to their acquirer in a batch mode, not as individual transactions. In addition to approval or denial, this batch timing may be used to determine the clearing estimate delay.

An card network may have greater visibility into the clearing timing of acquirers. With vast sums of clearing data available, the card network may develop a profile for each acquirer that also accounts for the factors that influence the clearing timing. For example, this dataset may also include information related to clearing timing as it relates to region of the transaction, time of day, type of merchant, each particular merchant, a transaction type, a merchant and/or cardholder type, etc. Using this information, the card network can notify the issuer bank of the anticipated clearing timeframe when the authorization occurs (via inserting an indicator in the authorization request, or making APIs available). The card network may also accumulate and report the expected settlement obligation pipeline for the issuer to use to manage settlement accounts accordingly.

In some embodiments, a system and method may employ an algorithm to estimate clearance timing information and insert the timing information into communications with the issuer or other parties to a transaction involving a payment device, as described herein. The estimated clearance timing information may be determined based on machine learning and other artificial intelligence techniques using historical data related to clearance timing for the particular entities involved in each transaction, as described herein. These techniques may be applied to each transaction to account for a wide range of historical delays that may occur for each of the particular entities, regions, transaction types, payment device types, etc., involved in the transaction.

In further embodiments, a computer-implemented method may incorporate the clearing delay estimate into a payment transaction process using a server and memory hosting an artificial intelligence engine. The method may store a dataset corresponding to payment transactions between a plurality of customers to a plurality of merchants. The payment transactions may each include an indication of a clearing delay. The method may also receive first data corresponding to a purchase transaction at a merchant and determine a clearing delay estimate for the purchase transaction based on an analysis by the artificial intelligence engine of the first data. The method may then modify one or more of an authorization process, a clearing process, and a settlement process for the purchase transaction in response to the clearing delay estimate being above a threshold. In further embodiments, clearing delay estimates may be used in aggregate to optimize completion of the purchase transaction. For example, over time, the clearing delay estimates delivered in each transaction may be aggregated on a periodic basis (e.g., day-by-day), outlining the expected payables for any given day. A given purchase transaction may be approved or denied based on lower than anticipated payables for the day the transaction is expected to clear.

In still further embodiments, a system may optimize clearing delay in a payment transaction process. The system may consist of a processor and memory hosting an artificial intelligence (AI) engine, a database, an input processor, a clearing delay module, and a modification module. The database may be coupled to the processor and the memory and store a dataset corresponding to payment transactions between a plurality of customers to a plurality of merchants. The payment transactions may each include a clearing delay. The input processor coupled to the processor and the memory may capture first data corresponding to a purchase transaction at a merchant. The clearing delay module may be coupled to an output of the AI engine and determine a clearing delay estimate for the purchase transaction based on an analysis by the AI engine of the first data. The modification module may be coupled to the processor and memory and modify one or more merchant and/or acquirer practices, or other modifiable parameters of the payment transaction process in response to the clearing delay estimate being above a threshold.

FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
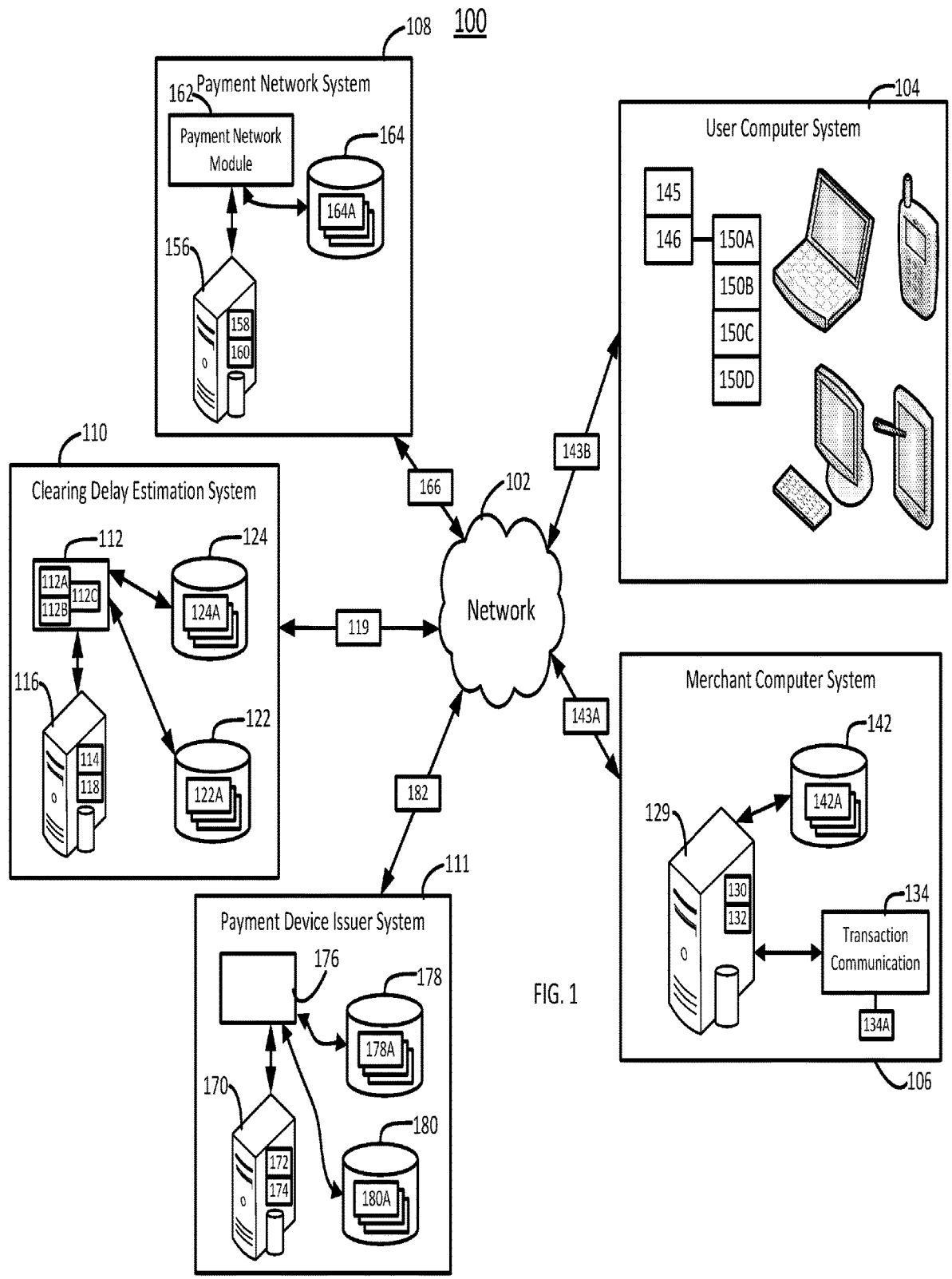
FIG. 1 shows an illustration of an exemplary payment system for intelligently estimating clearing time for a transaction involving a payment device.

FIG. 1 generally illustrates one embodiment of a payment system 100 for completing transactions such as payments and other funds transfers including an intelligently-determined estimate of the clearing time to complete the transaction. The system 100 may include a computer network 102 that links one or more systems and computer components. In some embodiments, the system 100 includes a user computer system 104, a merchant computer system 106, a payment network system 108, a clearing delay estimation system 110, and a payment device issuer system 111.

The network 102 may be described variously as a communication link, computer network, internet connection, etc. The system 100 may include various software or computer-executable instructions or components stored on tangible memories and specialized hardware components or modules that employ the software and instructions to estimate a clearing delay for a transaction by monitoring communications between users and merchants as well as other parties in the "Four Party Model," as described herein.

The various modules may be implemented as computer-readable storage memories containing computer-readable instructions (i.e., software) for execution by one or more processors of the system 100 within a specialized or unique computing device. The modules may perform the various tasks, methods, modules, etc., as described herein. The system 100 may also include both hardware and software applications, as well as various data communications channels for communicating data between the various specialized and unique hardware and software components.

The clearing delay estimation system 110 may include one or more instruction modules including a module 112 that, generally, may include instructions to cause a processor 114 of a clearing delay estimation server 116 to functionally communicate with a plurality of other computer-executable steps or sub-modules, e.g., sub-modules 112A, 112B, 112C, and components of the system 100 via the network 102. These modules 112A, 112B, 112C may include instructions that, upon loading into the server memory 118 and execution by one or more computer processors 114, determine a clearing delay estimate 119 for payment transactions between various users and/or merchants that may be processed by the payment network system 108. For example, sub-modules may include a first machine learning module 112A, a second machine learning module 112B, a data integration module 112C, etc. A first data repository 122 may store transaction data 122A for entities of the system 100. In some embodiments, further data repositories may correspond to different types of transaction data 122A or sub-components of the transaction data 122A (e.g., a transaction region, transaction type, a time of day, a merchant and/or customer type, a payment device type, a transaction clearing delay, transaction amount, cardholder name, cardholder account number, and other payment network account data 164A, etc.). Various other data 124A may be received and/or derived by the clearing delay estimation system 110 and stored in a second data repository 124 and used by the system 100 as described herein. For example, the second data repository may be used to store electronic wallet transaction details 124A from an electronic wallet system or other method of electronic or computer-based payment.

The merchant computer system 106 may include a computing device such as a merchant server 129 including a processor 130 and memory 132 including components to facilitate transactions with the user computer system 104 via other entities of the system 100. In some embodiments, the memory 132 may include a transaction communication module 134. The transaction communication module 134 may include instructions to send merchant messages 134A to other entities (i.e., 104, 108, 110, 111) of the system 100 to indicate a transaction has been initiated with the user computer system including payment device data and other data as herein described. The merchant computer system 106 may also include a transaction repository 142 and instructions to store payment and other transaction data 142A within the transaction repository 142. In some embodiments, the merchant computer system 106 may send payment data 143A corresponding to a payment device 200 (FIG. 2) to the payment network system 108 or other entities of the system 100, or receive payment data 143B from the user computer system 104 in an electronic wallet-based or other computer-based transaction between the user computer system 104 and the merchant computer system 106.

A user computer system 104 may include a processor 145 and memory 146. The user computing system 104 may include a server, a mobile computing device, a smartphone, a tablet computer, a Wi-Fi-enabled device or other personal computing device capable of wireless or wired communication, a thin client, or other known type of computing device. The memory may include various modules including instructions that, when executed by the processor 145 control the functions of the user computer system generally and integrate the user computer system 104 into the system 100 in particular. For example, some modules may include an operating system 150A, a browser module 150B, a communication module 150C, and an electronic wallet module 150D. In some embodiments, the electronic wallet module 150D and its functions described herein may be incorporated as one or more modules of the user computer system 104. In other embodiments, the electronic wallet module 150D and its functions described herein may be incorporated as one or more sub-modules of the payment network system 110.

The payment network system 108 may include a payment server 156 including a processor 158 and memory 160. The memory may include a payment network module 162 including instructions to facilitate payment between parties (e.g., one or more users, merchants, etc.) using the payment system 100. The module 162 may be communicably connected to an account holder data repository 164 including payment network account data 164A. The payment network account data 164A may include any data to facilitate payment and other funds transfers between system entities (i.e., 104, 106, 110, and 111). For example, the payment network account data 164A may include identification data, account history data, payment device data, etc. The module 162 may also include instructions to send payment messages 166 to other entities and components of the system 100 in order to complete transactions between users and/or merchants.

Figure 2A:
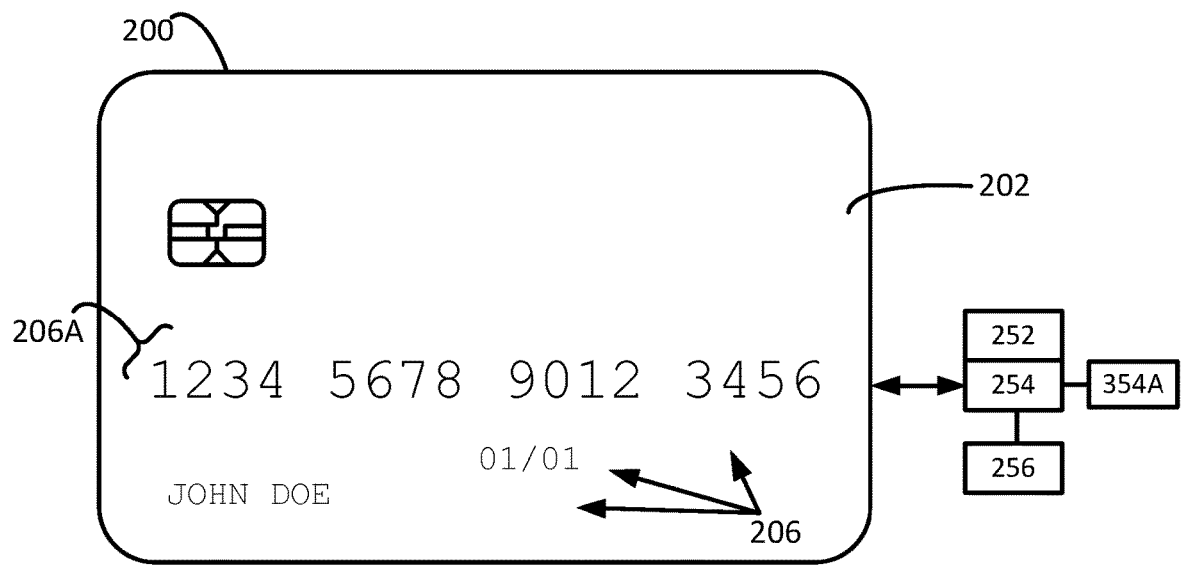
FIG. 2A shows a first view of an exemplary payment device for use with the system of FIG. 1.
Figure 2B:
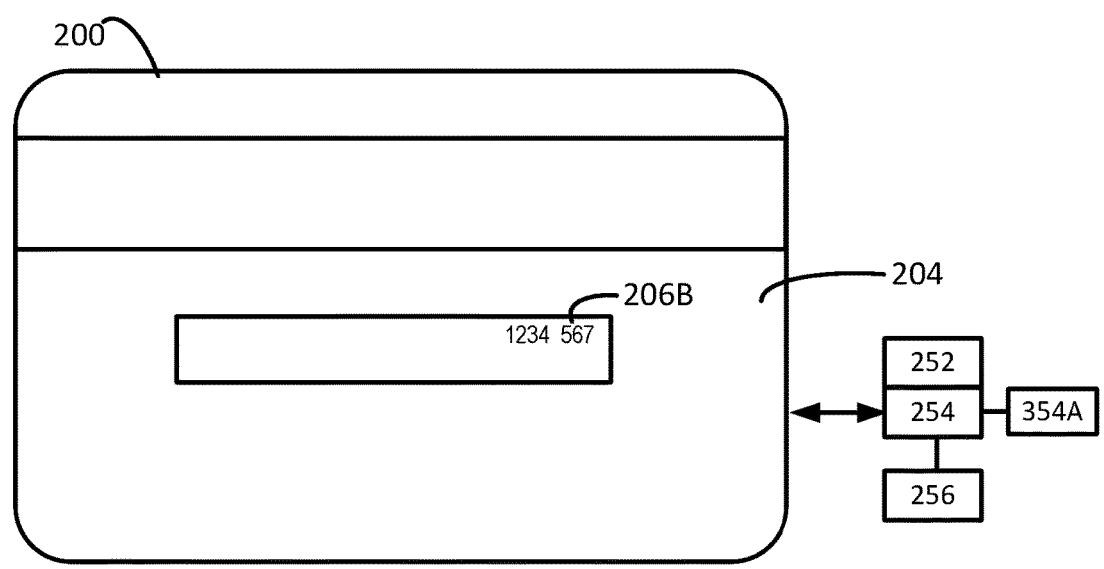
FIG. 2B shows a second view of an exemplary payment device for use with the system of FIG. 1.

With brief reference to FIGS. 2A and 2B, an exemplary payment device 200 may take on a variety of shapes and forms. In some embodiments, the payment device 200 is a traditional card such as a debit card or credit card. In other embodiments, the payment device 200 may be a fob on a key chain, an NFC wearable, or other device. In other embodiments, the payment device 200 may be an electronic wallet where one account from a plurality of accounts previously stored in the wallet is selected and communicated to the system 100 to execute the transaction. As long as the payment device 200 is able to communicate securely with the system 100 and its components, the form of the payment device 200 may not be especially critical and may be a design choice. For example, many legacy payment devices may have to be read by a magnetic stripe reader and thus, the payment device 200 may have to be sized to fit through a magnetic card reader. In other examples, the payment device 200 may communicate through near field communication and the form of the payment device 200 may be virtually any form. Of course, other forms may be possible based on the use of the card, the type of reader being used, etc.

Physically, the payment device 200 may be a card and the card may have a plurality of layers to contain the various elements that make up the payment device 200. In one embodiment, the payment device 200 may have a substantially flat front surface 202 and a substantially flat back surface 204 opposite the front surface 202. Logically, in some embodiments, the surfaces 202, 204 may have some embossments 206 or other forms of legible writing including a personal account number (PAN) 206A and the card verification number (CVN) 206B. In some embodiments, the payment device 200 may include data corresponding to the primary account holder, such as payment network account data 164A for the account holder. A memory 254 generally and a module 254A in particular may be encrypted such that all data related to payment is secure from unwanted third parties. A communication interface 256 may include instructions to facilitate sending payment data 143B, 143A such as a payment payload, a payment token, or other data to identify payment information to one or more components of the system 100 via the network 102.

A payment device issuer system 111 may also include a payment device issuer server 170 including a processor 172 and memory 174. The memory may include a payment device issuer module 176 including instructions to facilitate payment to the merchant computer system 106 using the payment system 100. The module 176 may be communicably connected to a clearing data repository 178 including account clearing data 178A. The clearing data 178A may include data to facilitate payment and other funds transfers to/from the merchant. For example, the clearing data 178A may include identification data, account history data, payment device data, etc. The module 176 may also be communicably connected to a cardholder account data repository 180 including cardholder account data 180A. The module 162 may also include instructions to receive payment messages 166 from the payment network system 108 and may include the clearing delay estimate 119 in order to complete transactions between users and/or merchants and better manage user and merchant funds account balances to complete transactions.

Figure 3:
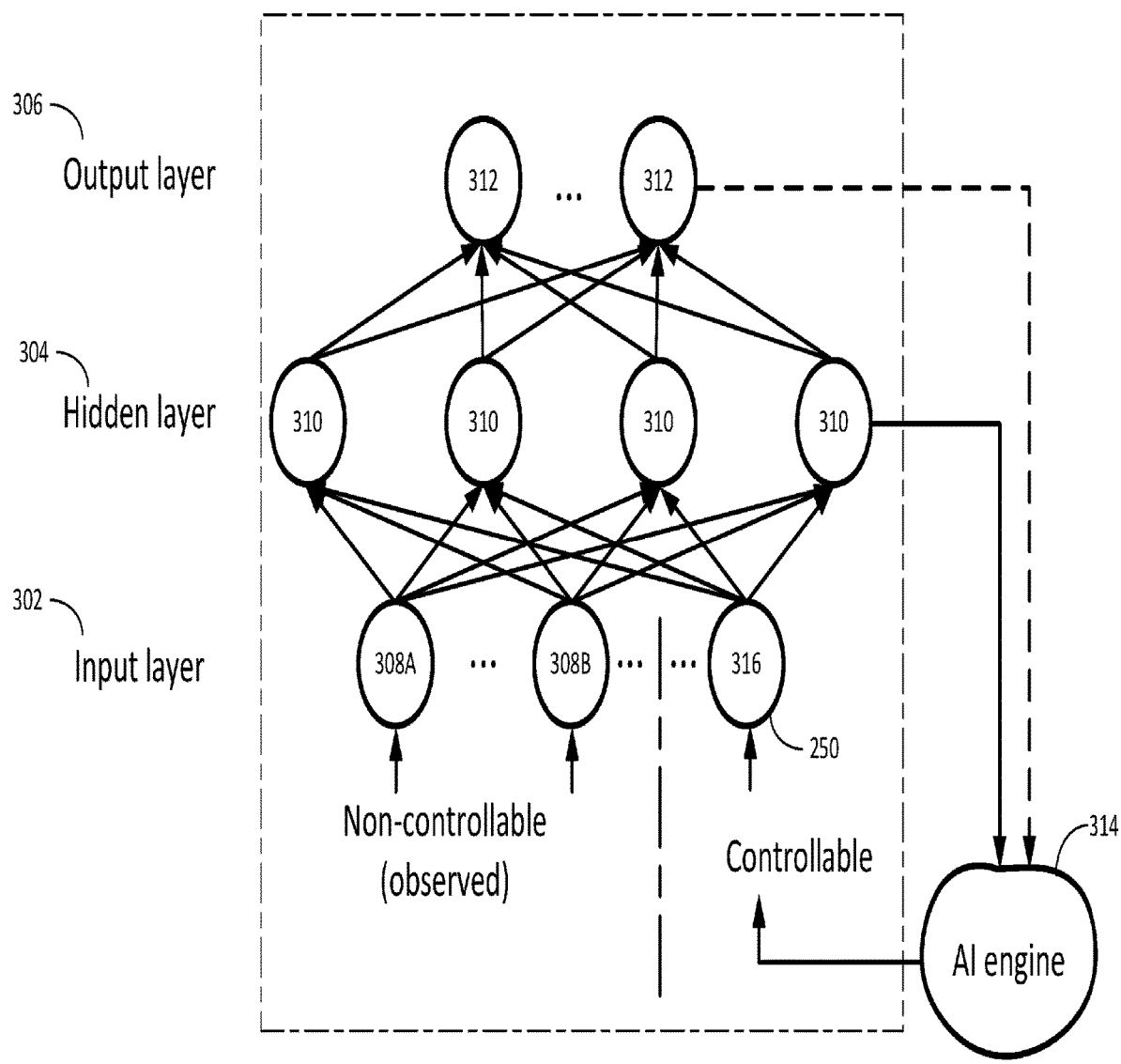
FIG. 3 is an illustration of one embodiment of a machine learning architecture for use with the system of FIG. 1 to estimate clearing time for a transaction involving a payment device.

With reference to FIG. 3, a machine learning (ML) architecture 300 may be used in a first machine learning module 112A and/or a second machine learning module 112B of the clearing delay estimation system 110 in accordance with the current disclosure. In some embodiments, the first machine learning module 112A and/or the second machine learning module 112B of the clearing delay estimation system may include instructions for execution on the processor 114 that implement the ML architecture 300. The ML architecture 300 may include an input layer 302, a hidden layer 304, and an output layer 306. The input layer 302 may include inputs 308A, 308B, etc., coupled to the data integration module 112C and represent those inputs that are observed from actual customer and merchant data in transactions. The hidden layer 304 may include weighted nodes 310 that have been trained for the transactions being observed. Each node 310 of the hidden layer 304 may receive the sum of all inputs 308A, 308B, etc., multiplied by a corresponding weight. The output layer 306 may present various outcomes 312 based on the input values 308A, 308B, etc., and the weighting of the hidden layer 304. Just as a machine learning system for a self-driving car may be trained to determine hazard avoidance actions based on received visual input, the machine learning architecture 300 may be trained to analyze a likely outcome for a given set of inputs based on thousands or even millions of observations of previous customer/merchant transactions.

During training of the machine learning architecture 300, a dataset of inputs may be applied and the weights of the hidden layer 310 may be adjusted for the known outcome associated with that dataset. As more datasets are applied, the weighting accuracy may improve so that the outcome prediction is constantly refined to a more accurate result. In this case, the first data repository 122 including transaction data 122A for entities of the system 100 may provide datasets for initial training and ongoing refining of the machine learning architecture 300.

Additional training of the machine learning architecture 300 may include the an artificial intelligence engine (AI engine) 314 providing additional values to one or more controllable inputs 316 so that outcomes may be observed for particular changes to the transaction data 122A or other data 124A. The values selected may represent different data types such as selected cryptographic methods applied to the payment network account data 164A, merchant messages 134A, sent payment data 143A, received payment data 143B, and other alternative data presented at various points in the transaction process and may be generated at random or by a pseudo-random process. By adding controlled variables to the transaction process, over time, the impact may be measured and fed back into the machine learning architecture 300 weighting to allow capture of an impact on a proposed change to the process in order to optimize the determination of the clearing delay estimate 119. Over time, the impact of various different data at different points in the transaction cycle may be used to predict an outcome for a given set of observed values at the inputs layer 302.

After training of the machine learning architecture 300 is completed, data from the hidden layer may be fed to the artificial intelligence engine 314 to generate values for controllable input(s) 316 to optimize the clearing delay estimate 119 or even reduce time for the clearing process. Similarly, data from the output layer may be fed back into the artificial intelligence engine 314 so that the artificial intelligence engine 314 may, in some embodiments, iterate with different data to determine via the trained machine learning architecture 300, whether a first merchant or acquirer practice or a second merchant or acquirer practice, and/or data transmission and network protocols may be most effective in optimizing the clearing delay for each particular merchant.

Figure 4:
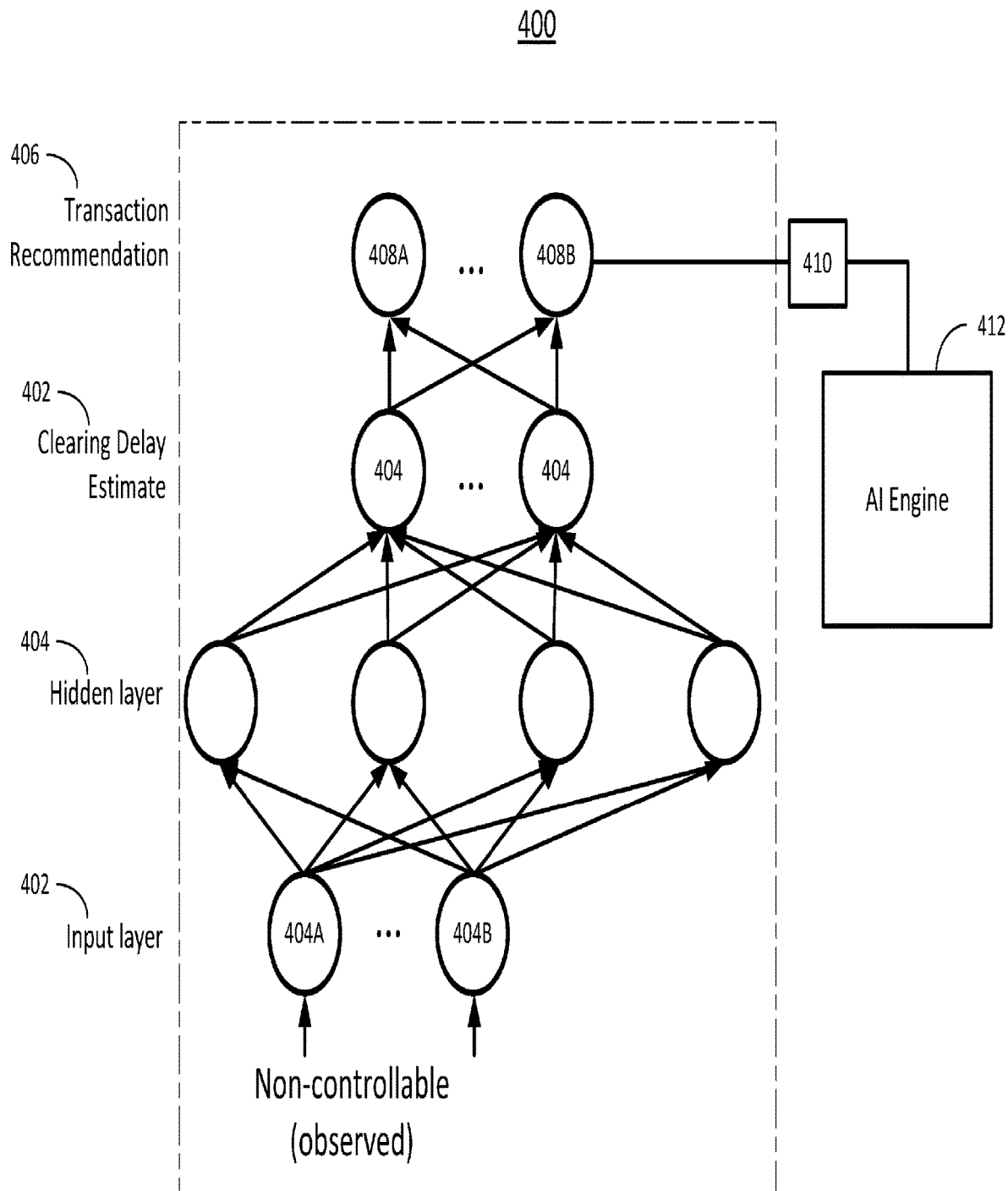
FIG. 4 is an illustration of another embodiment of a machine learning architecture for use with the system of FIG. 1 to estimate clearing time for a transaction involving a payment device.

With reference to FIG. 4, in other embodiments, the machine learning architecture 300 and artificial intelligence engine 314 may include a second instance of a machine learning architecture 400 and/or an additional node layer may be used. In some embodiments, a clearing delay estimate layer 402 may determine a predicted clearing delay 404 from observed inputs 404A, 404B. A transaction recommendation layer 406 with outputs 408A, 408B, etc., may be used to generate transaction recommendations 410 to an artificial intelligence engine 412, which in turn, may modify one or more of the payment network account data 164A, merchant messages 134A, sent payment data 143A, received payment data 143B, and other alternative data and the cryptographic methods used when communicating this data via an appropriate SDK.

Figure 5:
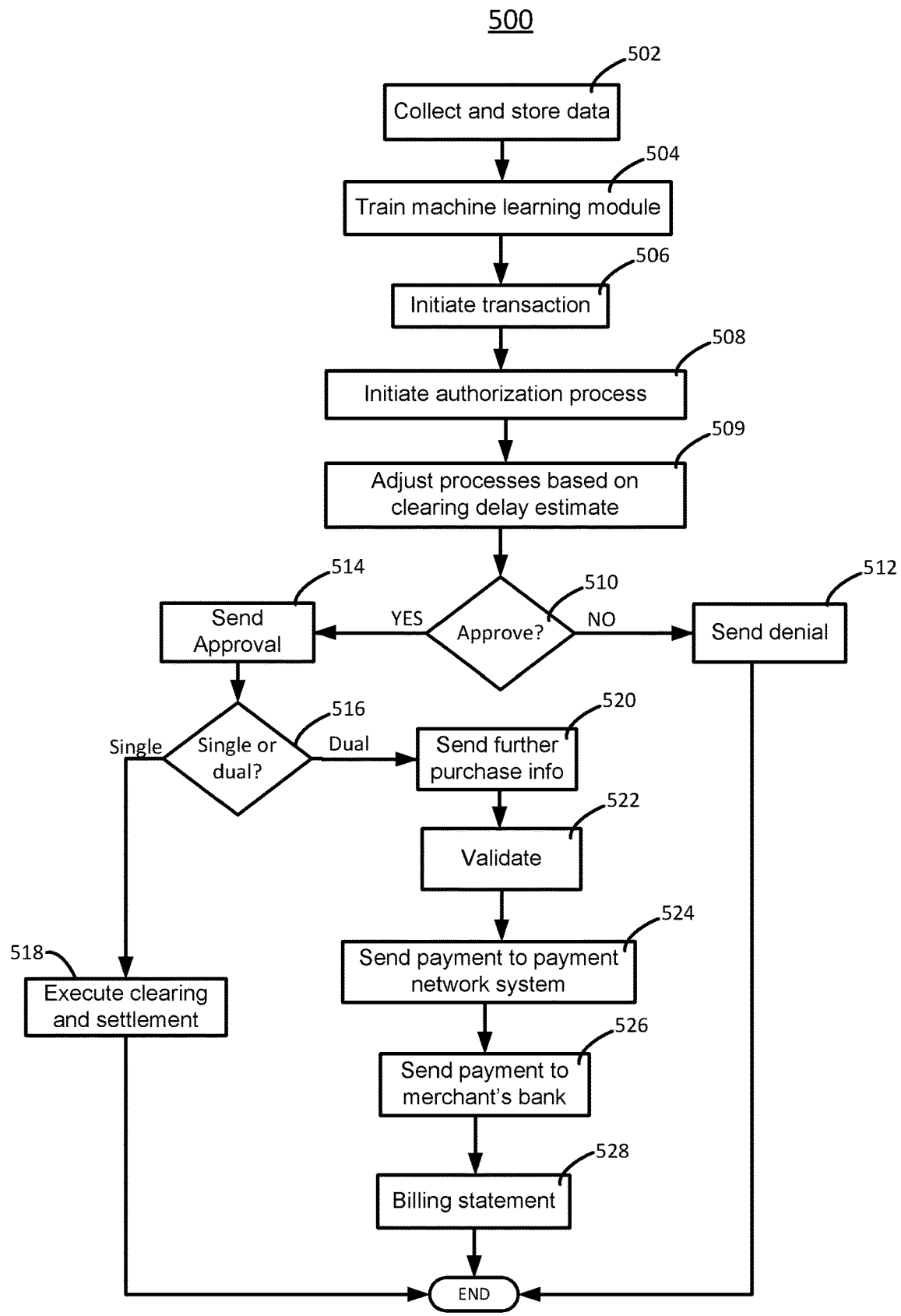
FIG. 5 is a flowchart of a method of determining and sending a clearing delay estimate to an entity within the system of FIG. 1 as part of a transaction process.

FIG. 5 is a flowchart of a method 500 for determining and incorporating a clearing delay estimate 119 into communications to complete a transaction using a payment device 200 within the system 100. Each step of the method 500 may be performed on a server or other computing device which may be physically configured to execute the different aspects of the method.

At block 502, the system 100 may collect and store a dataset (e.g., transaction data 122A, wallet transaction details 124A, merchant messages 134A, clearing data 178A, etc.) during communications to complete a payment transaction among the entities (i.e., the user, merchant, payment network system, issuer, etc.) of the system 100. The dataset may include individual data 122A for multiple individual customer interactions and transactions with multiple merchants. The data 122A may include type and amount of a transaction, a region of the card holder and/or merchant, a type of merchant and cardholder, a transaction type, etc., among others. The data 122A may also include outcome data such as items purchased, purchase volume, purchase value, time between transactions, etc. The data 122A may be stored, for example, in the data repository 122 at block 502. In an embodiment, the data 122A may be used by the AI engine 314 to determine infer the clearing delay estimate 119.

At block 504, the data 122A may be used to train a first or second machine learning (ML) module 112A, 112B to determine a clearing delay estimate 119. The training of the ML modules 112A, 112B may occur in two steps. First, "natural" data 122A may be collected from customer/merchant transactions. Second, "test" data 122A may be collected from transaction sessions for which some data may be intentionally altered to optimize the clearing delay estimate 119 or even reduce time for the clearing process. In some embodiments, different network settings, data structures, first and second encryption methods, etc., may be tested as controllable inputs 316. The test datasets may contain randomly generated changes, targeted changes based on suspected effects, or may be a combination of these or others.

At block 506, the method 500 may encrypt and communicate transaction data 122A and other data 124A corresponding to a payment device 200 used in a transaction with a customer from the merchant computer system 106 to the payment device issuer system 111 and initiate a customer/merchant transaction. In some embodiments, the transaction communication module 134 may execute an instruction to send the transaction data 122A and other data 124A via a merchant message 134 to one or more entities of the system 100. As described above, transaction data 122A may include a transaction region, transaction type, a time of day, a merchant and/or customer type, a payment device type, a past transaction clearing delay corresponding to the merchant, a transaction amount, cardholder name, account number, and payment network account data 164A stored on the payment device, etc.

At block 508, the method 500 may initiate an authorization process in response to receiving the transaction data 122A and other data 124A. Typically, the merchant computer system 106 may pass the transaction data 122A and other data 124A to the payment network system 108. The payment network system 108 may then check the encryption of the received transaction data 122A and other data 124A, determine the payment network account data 164A corresponding to the received data, and send it on to the cardholder's bank (i.e., the payment device issuer system 111) for approval. In some embodiments, the payment network system 108 may also pass the transaction data 122A and other data 124A to the clearing delay estimation system 110. There, the module 112 may execute instructions to determine a clearing delay estimate 119. The clearing delay estimate 119 may then be passed to other entities of the system 100. For example, the payment network system 108 may incorporate the clearing delay estimate 119 into communication regarding the transaction with one or more of the payment device issuer system 111, the merchant computer system 106, etc. In further embodiments, the clearing delay estimate 119 may be sent directly from the clearing delay estimation system 110 to other entities of the system 100.

At block 509, one or more entities of the system 100 may modify certain functions based on the clearing delay estimate 119. For example, the data integration module 112C may include instructions to payment network system 108, the payment device issuer system 111, the merchant computer system 106, etc., to modify cryptographic methods, settings of the network 102, and other metrics as herein described. Payers may adjust amounts typically forecasted for dispersal to payees based on the clearing delay estimate 119 or a statistical analysis of the clearing delay estimate 119. For example, the payment network module 162 of the payment network system 108 and/or the merchant computer system may cause a transaction to be denied because the clearing delay estimate 119 is above a threshold time limit. Likewise, a payment device issuer system 111 may adjust funds available to disperse to merchants based on longer or shorter clearing delay estimates.

At block 510, the payment device issuer system 111 may approve the transaction data 122A and other data 124A upon determining that the transaction amount and other data within the transaction data 122A and other data 124A matches thresholds of the cardholder account data 180A corresponding to the payment network account data 164A. In some embodiments, the payment device issuer system 111 may use the clearing delay estimate 119 as one of the thresholds for approving the transaction data 124A and other data 124A. For example, at block 510, if the clearing delay estimate 119 is too long, then the system 111 may not approve the transaction and send a corresponding denial message to one or more entities of the system 100 at block 512 and the method may end. Conversely, if the clearing delay estimate 119 is below the threshold at block 510, then the system 111 may approve the transaction and send a corresponding approval message to one or more entities of the system 100 at block 514. In further embodiments, the method 500 may use the clearing delay estimate 119 in aggregate to optimize completion of the purchase transaction at block 510. For example, over time, the clearing delay estimates delivered in each transaction may be aggregated on a periodic basis (e.g., day-by-day), outlining the expected payables for any given day. Then, at block 510, the method 500 may approve or deny a given purchase transaction based on lower than anticipated payables for the day the transaction is expected to clear.

At block 516, if the system 100 operates as a single-message system, the method 500 may proceed to block 518 to execute clearing and settlement of the transaction and end.

At block 520, if the system 100 operates as a dual-message system, the method 500 may send further purchase information to the payment network system 108 from the merchant's bank. At block 522, the payment network system 108 may validate the received further purchase information and send it to the payment device issuer system 111 to prepare the cardholder's statement. The payment network system 108 may also provide comprehensive reconciliation to both the merchant's bank and to the payment device issuer system 111. At block 524, the method 500 may cause the payment device issuer module 176 to execute an instruction to send payment to the payment network system 108 or an agent of the system 108. At block 526, the payment network system 108 may send payment to the merchant's bank for reconciliation with the merchant computer system 106. At block 528, the method 500 may cause the payment device issuer module 176 to send a billing statement to the user computer system 104 and end.

Figure 6:
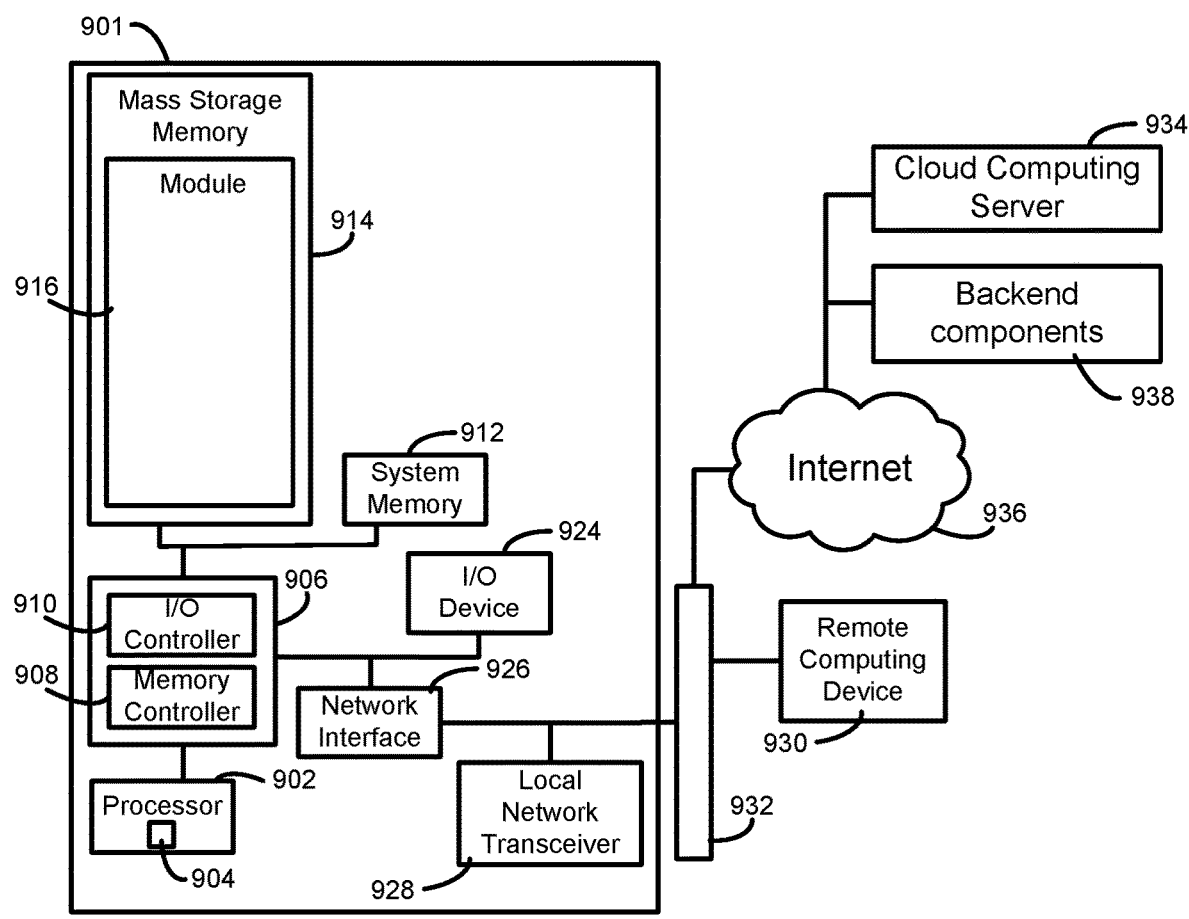
FIG. 6 shows an exemplary computing device that may be physically configured to execute the methods and include the various components described herein.

FIG. 6 is a high-level block diagram of an example computing environment 900 for the system 100 and methods (e.g., method 500) as described herein. The computing device 900 may include a server (e.g., the payment server 156, merchant server 129, payment server 156, clearing delay estimation server 116, mobile computing device (e.g., user computing system 104), a cellular phone, a tablet computer, a Wi-Fi-enabled device or other personal computing device capable of wireless or wired communication), a thin client, or other known type of computing device.

Logically, the various servers may be designed and built to specifically execute certain tasks. For example, the payment server 156 may receive a large amount of data in a short period of time meaning the payment server may contain a special, high speed input output circuit to handle the large amount of data. Similarly, the clearing delay estimation server 116 may execute processor intensive machine learning algorithm and thus the clearing delay estimation server 116 may have increased processing power that is specially adapted to quickly execute the machine learning algorithms. In yet another example, the merchant server 129 may be under less computing strain than the clearing delay estimation server 116 and may have less processing power than the clearing delay estimation server.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 100 is described below as including a plurality of peripherals, interfaces, chips, memories, etc., one or more of those elements may be omitted from other example processor systems used to implement and execute the example systems and methods. Also, other components may be added.

As shown in FIG. 6, the computing device 901 includes a processor 902 that is coupled to an interconnection bus. The processor 902 includes a register set or register space 904, which is depicted in FIG. 6 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 6, the computing device 901 may be a multi-processor device and, thus, may include one or more additional processors that are identical or similar to the processor 902 and that are communicatively coupled to the interconnection bus.

The processor 902 of FIG. 6 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 6 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method using a server including a processor and a memory with processor-executable instructions for:
   receiving, through one or more processors of an input processor coupled to the server and memory and from a communication module of a merchant computer system over a computer network, a purchase transaction at a merchant;
   correlating the purchase transaction to a known outcome associated with a time aggregation of clearing delays, wherein the clearing delays are each associated with different payment transactions between a plurality of customers and a plurality of merchants, and each different payment transaction includes an indication of a clearing delay;
   determining a clearing delay estimate for the purchase transaction based on the correlation between the purchase transaction and the known outcome;
   inserting the clearing delay estimate into a communication corresponding to an authorization process for the purchase transaction, wherein the communication is between a payment network system and a payment device issuer system, and the payment device issuer system is communicably linked to the merchant computer system;
   determining an expected payable amount based on the time aggregated clearing delay estimate;
   modifying the authorization process based on the clearing delay estimate of the communication by approving or denying the purchase transaction when the expected payable amount is above or below a threshold payable amount, respectively; and
   in response to the clearing delay estimate being above a threshold time, automatically adjusting funds available to disperse to the plurality of merchants based on the clearing delay estimate.

2. The method of claim 1, further comprising instructions for storing a dataset corresponding to payment transactions between a plurality of customers to a plurality of merchants, each payment transaction including an indication of a clearing delay.

3. The method of claim 1, wherein the instructions for determining the clearing delay estimate for the purchase transaction based on the correlation between the purchase transaction and the known outcome include instructions for determining, through one or more processors of a clearing delay estimation system, the clearing delay estimate for the purchase transaction based on an analysis by an artificial intelligence engine of the purchase transaction by providing the payment transactions between the plurality of customers and the plurality of merchants to a machine learning architecture that correlates the purchase transaction to a known outcome associated with the payment transactions between the plurality of customers and the plurality of merchants.

4. The method of claim 1, wherein the authorization process includes instructions for: 1) aggregating the clearing delay estimate over a period of time, and 2) approving or denying the purchase transaction.

5. The method of claim 1, wherein the instructions for modifying the authorization process in based on the clearing delay estimate of the communication include instructions for sending a denial message in response to the clearing delay estimate being above the threshold time or instructions for sending an approval message in response to the clearing delay estimate being below the threshold time.

6. The method of claim 1, wherein one or more of the different payment transactions include a dual message transaction and the instructions for modifying the authorization process based on the clearing delay estimate include instructions for modifying a cryptographic method for the authorization process.

7. The method of claim 1, wherein the purchase transaction and each different purchase transaction includes one or more of a transaction region, a transaction type, a time of day, a merchant type, a customer type, a payment device type, a transaction amount, a cardholder name, and a cardholder account number.

8. A system for optimizing a clearing delay in a payment transaction process comprising:
   a processor and memory;
   an input processor coupled to the processor and the memory, the input processor capturing a purchase transaction at a merchant computer system of a merchant;
   a clearing delay module coupled to the processor and memory that:
   1) correlates the purchase transaction to a known outcome associated with a time aggregation of clearing delays, wherein the clearing delays are each associated with different payment transactions between a plurality of customers and a plurality of merchants, and each different payment transaction includes an indication of a clearing delay; and
   2) determines a clearing delay estimate for the purchase transaction based on the correlation between the purchase transaction and the known outcome;

a modification module coupled to the processor and memory that:
1) inserts the clearing delay estimate into a communication corresponding to an authorization process for the purchase transaction, wherein the communication is between a payment network system and a payment device issuer system, and the payment device issuer system is communicably linked to the merchant computer system;
2) determines an expected payable amount based on the time aggregated clearing delay estimate;
3) modifies the authorization process based on the clearing delay estimate of the communication by approving or denying the purchase transaction when the expected payable amount is above or below a threshold payable amount, respectively; and
4) adjusts funds available to disperse to the plurality of merchants based on the clearing delay estimate.

9. The system of claim 8, wherein the clearing delay module that determines the clearing delay estimate for the purchase transaction based on the correlation between the purchase transaction and the known outcome further determines the clearing delay estimate for the purchase transaction based on an analysis by an artificial intelligence engine of the purchase transaction by providing the payment transactions between the plurality of customers and the plurality of merchants to a machine learning architecture that correlates the purchase transaction to a known outcome associated with the payment transactions between the plurality of customers and the plurality of merchants.

10. The system of claim 8, wherein the authorization process includes instructions for: 1) aggregating the clearing delay estimate over a period of time, and 2) approving or denying the purchase transaction.

11. The system of claim 8, wherein the modification module coupled to the processor and memory that modifies the authorization process based on the clearing delay estimate of the communication further sends a denial message in response to the clearing delay estimate being above a threshold time or instructions for sending an approval message in response to the clearing delay estimate being below a threshold time.

12. The system of claim 8, wherein one or more of the different payment transactions include a dual message transaction and the modification module coupled to the processor and memory that modifies the authorization process based on the clearing delay estimate of the communication further modifies a cryptographic method for the authorization process.

13. A non-transitory computer-readable medium for optimizing a clearing delay in a payment transaction process comprising processor-executable instructions for:
receiving, through one or more processors of an input processor coupled to a server and a memory and from a communication module of a merchant computer system over a computer network, a purchase transaction at a merchant;
correlating the purchase transaction to a known outcome associated with a time aggregation of clearing delays, wherein the clearing delays are each associated with different payment transactions between a plurality of customers and a plurality of merchants, and each different payment transaction includes an indication of a clearing delay;
determining a clearing delay estimate for the purchase transaction based on the correlation between the purchase transaction and the known outcome;
inserting the clearing delay estimate into a communication corresponding to an authorization process for the purchase transaction, wherein the communication is between a payment network system and a payment device issuer system, and the payment device issuer system is communicably linked to the merchant computer system;
determining an expected payable amount based on the time aggregated clearing delay estimate;
modifying the authorization process based on the clearing delay estimate of the communication by approving or denying the purchase transaction when the expected payable amount is above or below a threshold payable amount, respectively; and
in response to the clearing delay estimate being above a threshold time, automatically adjusting funds available to disperse to the plurality of merchants based on the clearing delay estimate.

14. The non-transitory computer-readable medium of claim 13, wherein the instructions for determining the clearing delay estimate for the purchase transaction based on the correlation between the purchase transaction and the known outcome includes instructions for determining the clearing delay estimate for the purchase transaction based on an analysis by an artificial intelligence engine of the purchase transaction by providing the payment transactions between the plurality of customers and the plurality of merchants to a machine learning architecture that correlates the purchase transaction to a known outcome associated with the payment transactions between the plurality of customers and the plurality of merchants.

15. The non-transitory computer-readable medium of claim 13, wherein the authorization process includes instructions for: 1) aggregating the clearing delay estimate over a period of time, and 2) approving or denying the purchase transaction.

16. The non-transitory computer-readable medium of claim 13, wherein:
the instructions for modifying the authorization process based on the clearing delay estimate of the communication includes instructions for sending a denial message in response to the clearing delay estimate being above the threshold time or instructions for sending an approval message in response to the clearing delay estimate being below the threshold time; and
one or more of the different payment transactions include a dual message transaction, wherein a modification module coupled to the processor and memory modifies the authorization process based on the clearing delay estimate of the communication and further modifies a cryptographic method for the authorization process.

* * * * *